(12) United States Patent
Xing et al.

(10) Patent No.: US 11,712,034 B2
(45) Date of Patent: Aug. 1, 2023

(54) ANIMAL REPELLING DEVICE AND ANIMAL REPELLING METHOD

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 476 days.

(21) Appl. No.: 16/882,481

(22) Filed: May 23, 2020

(65) Prior Publication Data

US 2021/0161119 A1    Jun. 3, 2021

(30) Foreign Application Priority Data

Nov. 29, 2019   (CN) .......................... 201911205958.3

(51) Int. Cl.
*A01M 29/00*   (2011.01)
*A01M 29/12*   (2011.01)

(52) U.S. Cl.
CPC .................................. *A01M 29/12* (2013.01)

(58) Field of Classification Search
CPC ............ A01M 29/12; A61L 9/015; A61L 9/02
See application file for complete search history.

(56) References Cited

U.S. PATENT DOCUMENTS

| 10,799,838 B1* | 10/2020 | Brookins | .................. | B01F 3/04 |
| 2004/0005252 A1* | 1/2004 | Siess | ........................ | B01J 19/08 |
| | | | | 422/186.3 |
| 2004/0074991 A1* | 4/2004 | Felegy | ..................... | B65D 1/32 |
| | | | | 239/327 |
| 2006/0188238 A1* | 8/2006 | Kent | ....................... | A61J 33/06 |
| | | | | 392/394 |
| 2017/0198736 A1* | 7/2017 | Pietro | ..................... | F16B 13/08 |

(Continued)

FOREIGN PATENT DOCUMENTS

| CN | 101121037 A | 2/2008 |
| CN | 106250295 A | 12/2016 |
| CN | 206776607 U | 12/2017 |

(Continued)

OTHER PUBLICATIONS

Extended European Search Report in Application No. 20178876.7, dated Oct. 22, 2020.

*Primary Examiner* — Joshua J Michener
*Assistant Examiner* — Henry Hooper Mudd
(74) *Attorney, Agent, or Firm* — Syncoda LLC; Feng Ma (57) ABSTRACT

An animal repelling device includes a container, an end cap provided with through holes, a liquid level sensor and a wireless communication component. An animal repelling method includes: injecting volatile liquid for repelling animals in the container, and closing the end cap, in which the volatile liquid is vaporized to the outside; and detecting the liquid level through a liquid level sensor, and transmitting liquid level information to a wireless communication component, and controlling the vaporization of the volatile liquid via the wireless communication component. the vaporization of drugs for repelling animals can be intelligently controlled; and the remaining amount of the drugs for repelling animals can be automatically monitored to replenish the drugs in time.

20 Claims, 3 Drawing Sheets

(56) References Cited

U.S. PATENT DOCUMENTS

| | | | |
|---|---|---|---|
| 2017/0216474 A1* | 8/2017 | Kelsen | ................ A61L 9/12 |
| 2019/0008137 A1* | 1/2019 | Shapiro | ............ A01M 29/12 |

FOREIGN PATENT DOCUMENTS

| CN | 108094399 A | 6/2018 |
|---|---|---|
| CN | 208925038 U | 6/2019 |
| CN | 209154616 U | 7/2019 |
| WO | 03019082 A1 | 3/2003 |
| WO | 2018108585 A1 | 6/2018 |

\* cited by examiner

ANIMAL REPELLING DEVICE AND ANIMAL REPELLING METHOD

CROSS-REFERENCE TO RELATED APPLICATION

This application claims priority to Chinese Patent Application No. 201911205958.3 filed on Nov. 29, 2019, the disclosure of which is hereby incorporated by reference in its entirety.

BACKGROUND

As more and more families keep pets, they also have a great impact on the environment. Many pets, for example, dogs often urinate and defecate near pillars, walls and the like, to declare their territories with their own scent. When other animals smell something other than themselves, they will not invade.

SUMMARY

Various embodiments of the present disclosure provide an animal repelling device and an animal repelling method.

According to one aspect of the present disclosure, there is provided an animal repelling device including: a container, a container formed with an opening at one end thereof and a liquid storage space therein; an end cap having a top plate and a side wall surrounding the opening, the side wall or the top plate forming with through holes; one or more liquid level sensors disposed in the container and proximal to bottom of the container; and a wireless communication component disposed on the container and configured to receive a liquid level signal sent by the liquid level sensor.

In some embodiments, the animal repelling device further includes: a heater disposed in the container; and a power supply electrically connected with the heater; wherein the heater operates based on a heater-operating instruction received by the wireless communication component.

In some embodiments, the power supply is a solar-energy photo-voltaic power supply disposed at an outer surface of the side wall or the top plate of the end cap.

In some embodiments, the heater is a heating rod with one end connected to the end cap and the other end extending towards the bottom in the container.

In some embodiments, the one or more liquid level sensors includes a first liquid level sensor disposed at one end of the heating rod proximal to the bottom of the container.

In some embodiments, the one or more liquid level sensors further includes a plurality of second liquid level sensors disposed on a circumferential surface of the heating rod.

In some embodiments, the animal repelling device further includes a valve disposed between the through holes and the opening of the container.

In some embodiments, the animal repelling device further includes a control terminal controlling opening and closing of the valve and operation of the heater based on information received by the wireless communication component.

In some embodiments, the animal repelling device further includes a power sensor sending a power supply capacity signal to the wireless communication component.

In some embodiments, the animal repelling device further includes a fixing structure including an internal threaded hole portion extending from the bottom of the container in a direction distal from the end cap.

In some embodiments, the fixing structure further includes one or more connectors connected with the container through the internal threaded hole portion; and the one or more connectors include at least one of a suction connector, a reducing joint adapter connector or a bracket connector.

In some embodiments, the animal repelling device further includes an attaching structure including: a bolt having a nut, a polished rod and a screw rod connected sequentially; and a connecting member a connecting member with one end fixed on the end cap and the other end provided with a circular ring; wherein an outside diameter of the screw rod is less than an outside diameter of the polished rod, and the outside diameter of the polished rod is less than an inside diameter of the circular ring.

In some embodiments, the animal repelling device further includes: a fixing structure including an internal threaded hole portion extending from the bottom of the container in a direction distal from the end cap, and a connector connected with the container through the internal threaded hole portion; and an attaching structure including a bolt having a nut, a polished rod and a screw rod connected sequentially; and a connecting member with one end fixed on the end cap and the other end provided with a circular ring; wherein an outside diameter of the screw rod is less than an outside diameter of the polished rod, and the outside diameter of the polished rod is less than an inside diameter of the circular ring.

In some embodiments, the animal repelling device further includes a structure configured to mounting the animal repelling device to an axle of car wheel in an orientation that the end cap covering/surrounding the opening is kept upwards.

According to another aspect of the present disclosure, there is provided an animal repelling method being applied to an animal repelling device including a valve and a heater immersed in a volatile liquid for repelling animal, the method including:

receiving an opening instruction sent by a control terminal wirelessly connected with the animal repelling device; and opening the valve of the animal repelling device according to the opening instruction, and turning on the heater of the animal repelling device.

In some embodiments, the animal repelling device further includes a liquid level sensor; and the animal repelling method further includes: turning off the heater of the animal repelling device when the liquid level sensor detects that the liquid level is lower than a predetermined level.

In some embodiments, the method further includes: sending liquid replenishment information that the liquid level is lower than the predetermined level to the control terminal, to remind a user to replenish the liquid in time.

In some embodiments, the method further includes: sending capacity reminding information that a power supply capacity is lower than a predetermined threshold to the control terminal when a power sensor of the animal repelling device detects that the power supply capacity is lower than the predetermined threshold, to remind the user to replace batteries or charge in time.

In some embodiments, the method further includes: receiving information associated with an operating status of an equipment provided with the animal repelling device; turning on the heater and opening the valve when the operating status is off; and turning off the heater and closing the valve when the operating status is on.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a portion of this disclosure, illustrate embodiments consistent with the disclosure and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The terms used in the present disclosure are for the purpose of describing particular embodiments only and are not intended to limit the present disclosure. Unless otherwise defined, the technical or scientific terms used in the present disclosure shall have the ordinary meanings understood by those with ordinary skills in the art to which the present disclosure belongs. The terms "first," "second," and the like used in the description and the claims of the present disclosure do not indicate any order, quantity or importance, but are only used to distinguish different components. Similarly, similar words such as "a" or "an" do not indicate a limit on quantity, but rather indicate that there is at least one. Unless otherwise specified, "comprise" or "include" and similar words mean that the element or object appearing before "comprise" or "include" encompasses the element or object appearing after "comprise" or "include" and the equivalent thereof, without excluding other elements or objects. Words such as "connection/connecting" or "connected" are not limited to physical or mechanical connection, and may include direct or indirect electrical connection.

The singular forms "a/an," "the" and "said" used in the description of the present disclosure and the attached claims are intended to include the plural forms, unless the context clearly indicates otherwise. It should be understood that terms "and/or" used herein refers to and comprises any or all possible combinations of one or more of the associated listed items.

Dogs also often urinate and defecate adjacent to automobile tires. After dogs urinate and defecate at the tires, the smell is unpleasant, and the acid contained in the excrement will corrode the tires, which not only causes troubles to the automobile owner but also poses a safety hazard.

In order to prevent dogs and other pets from urinating and defecating at car tires, car owners have taken many measures, for example, spraying agents on the tires regularly for repelling animals. However, the agent for repelling animals requires users to spray manually. Moreover, due to strong volatility, the agent sprayed on the tires would disappear quickly with wind, rain, car washing or the like.

In addition to the tires mentioned above, animals such as pets are not expected to appear or step in gardens or waterscape in neighborhoods. In order to prevent the animals from appearing in such places, users often spray the agents for repelling animals or put drugs for repelling animals in an open space, and have to observe the degree of vaporization of the drugs from time to time. However, they cannot find in time that the drugs have vaporized totally.

Figure 1:
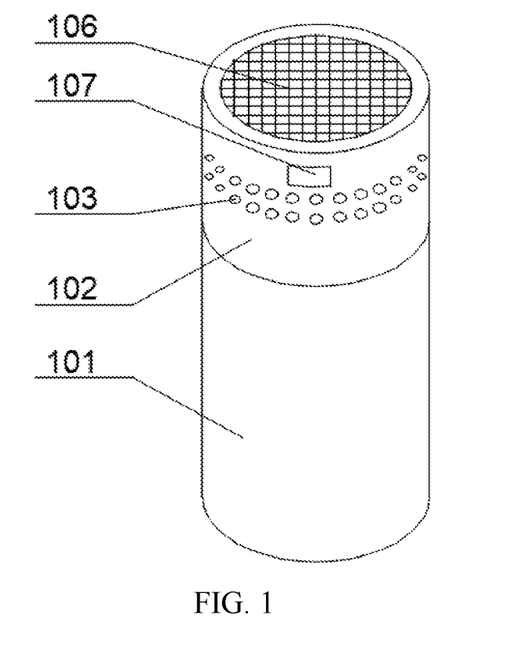
FIG. 1 is a perspective view illustrating an animal repelling device in accordance with some embodiments of the present disclosure.
Figure 2:
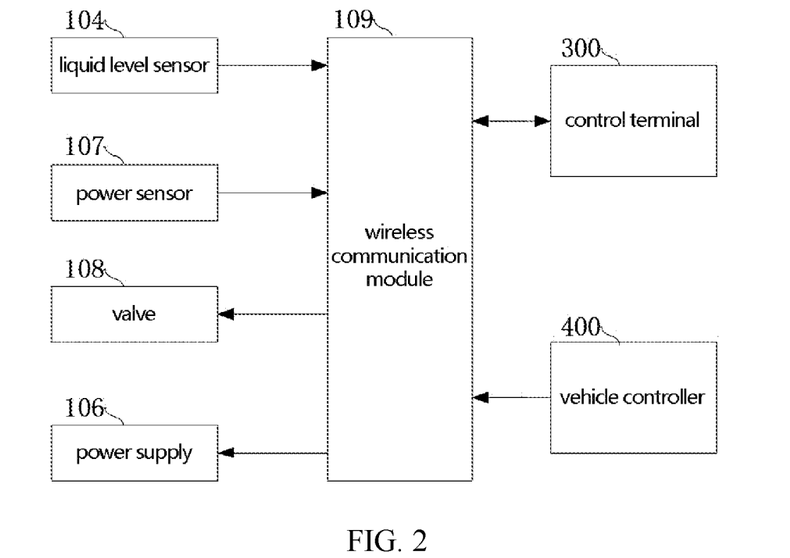
FIG. 2 is a block diagram illustrating a monitoring system of the animal repelling device in accordance with some embodiments of the present disclosure.
Figure 3:
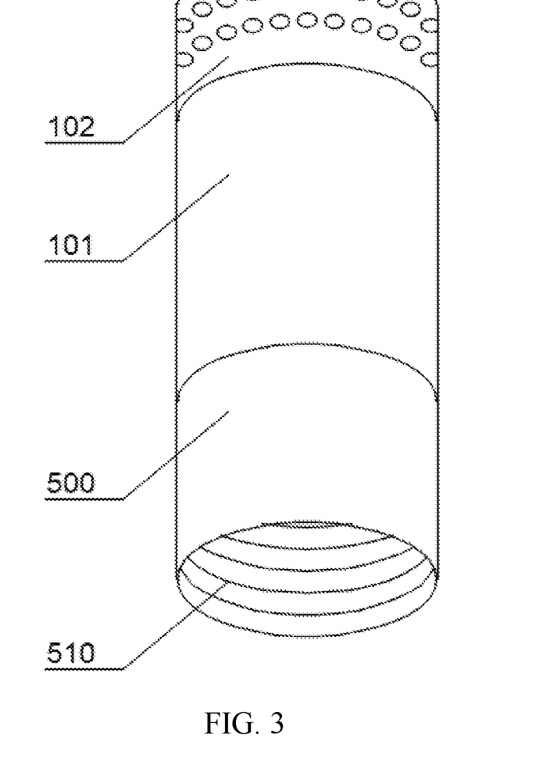
FIG. 3 is a perspective view illustrating a fixing structure of the animal repelling device in accordance with some embodiments of the present disclosure.

FIG. 1 is a perspective view illustrating an animal repelling device in accordance with some embodiments of the present disclosure. FIG. 2 is a structural block diagram illustrating a monitoring system of the animal repelling device in accordance with some embodiments of the present disclosure. FIG. 3 is an exploded view of the animal repelling device in accordance with some embodiments of the present disclosure.

Referring to FIGS. 1, 2 and 3, the exemplary embodiment of the present disclosure provides an animal repelling device 10 including a container 101, an end cap 102, one or more liquid level sensors 104 and a wireless communication component 109.

An opening is formed at one end of the container 101, and a liquid storage space is formed in the container 101. The end cap 102 includes a top plate and a side wall surrounding the opening, and through holes 103 are formed on the side wall or the top plate. The one or more liquid level sensors 104 are disposed in the container 101, at a position proximal to the bottom of the container 101. The wireless communication component 109 is disposed on the container 101 and configured to receive a liquid level signal sent by the liquid level sensor 104.

The through holes 103 may be provided on a circumferential side surface of the end cap 102 or a top surface of the end cap 102.

The above structure constitutes the animal repelling device 10 provided by the present disclosure. Volatile liquid is stored in the liquid storage space in the container 101 and can volatilize to the outside of the container 101 via through holes on the end cap 102. In the present embodiment, a plurality of through holes 103 are formed on the side wall or the top plate of the end cap 102 to improve the vaporization effect of liquid to the outside of the device. The liquid level in the container 101 is sensed by the liquid level sensor 104. when volatile liquid is insufficient (namely, the liquid level is lower than the position of the liquid level sensor 104), the wireless communication component 109 is adopted to control the liquid to stop vaporization to the outside of the container 101.

The above animal repelling device has the function of effectively repelling animals by injecting the volatile liquid for repelling animals in the container 101, and can automatically detect the remaining amount of the volatile liquid by arrangement of the liquid level sensor 104 so as to replenish the volatile liquid in time. The animal repelling device can intelligently control the vaporization of drugs for repelling animals, and automatically monitor the remaining amount of the drugs for repelling animals so as to replenish the volatile liquid drugs in time.

Vaporization of the volatile liquid can be accelerated as the temperature rises. By utilization of this characteristic, the liquid can be heated to increase the speed of liquid vaporization.

In some embodiments, the animal repelling device further includes a heater 105 and a power supply 106. The heater 105 is disposed in the container 101. The power supply 106 is electrically connected with the heater 105. The heater 105 operates according to a heater-operating instruction for the heater 105 received by the wireless communication component 109.

The heater 105 disposed in the container 101 generates heat by the power supply 106 to heat the volatile liquid, so as to increase the speed of liquid vaporization. The ON/OFF of the power supply 106 may be controlled by the wireless communication component 109.

The power supply 106 may be batteries and the like. Considering that batteries have to be changed in time if used up and that the volume and weight of the animal repelling device are increased with complicated structure due to the batteries, natural resources are utilized in the present disclosure to convert into electrical energy so as to avoid resource waste.

In some embodiments, the power supply 106 is a solar-energy photo-voltaic power supply disposed at an outer surface of the side wall or the top plate of the end cover 102.

The conversion of solar energy into electrical energy can avoid resource waste, effectively utilize natural resources, simplify the device structure, and save the cost. In the process of using the animal repelling device, the end cap 102 must be kept in an orientation on the upper portion of the device to prevent the liquid from flowing out via the through holes 103. Thus, the solar-energy photo-voltaic power supply is arranged on the outer surface of the side wall or the top plate of the end cap 102 such that the solar energy can be fully received, improving the power-generating efficiency of the solar energy. In the present embodiment, in order to improve the power-generating efficiency of the solar energy, the solar-energy photo-voltaic power supply is disposed on the top plate of the end cap 102.

The heater 105 may be a widely used device in various devices. Various types of heaters 105 may be adopted according to different use objectives and heating degrees. In the animal repelling device of the present disclosure, there is no need for volatile liquid to use complicated and large-scale heater since the vaporization efficiency can be greatly improved by slight increasing the temperature of the liquid.

In some embodiments, the heater 105 is a heating rod with one end connected with the end cap 102 and the other end extending towards the bottom in the container.

The heat generated by the heating rod after electrified is enough to increase temperature of the liquid to accelerate the vaporization, with simple structure and low cost. Since one end of the heating rod is connected with the end cap 102, and the other end is proximal to the bottom of the container 101, liquid waste is reduced and liquid temperature is uniform from top to bottom. When the liquid is heated by the heating rod, the liquid is required at least contact the bottom of the heating rod, so as to avoid the dry burning or even burnout of the heating rod. Thus, the liquid must always contact the heating rod. On one hand, in order to ensure the full utilization of the liquid, the bottom of the heating rod must be proximal to the bottom of the container 101 as much as possible. On the other hand, in order to ensure that the liquid always contacts the bottom of the heating rod, the liquid level sensor 104 is not lower than the bottom of the heating rod.

In some embodiments, the liquid level sensor (first liquid level sensor) 104 is disposed at one end of the heating rod proximal to the bottom of the container 101.

As described above, the liquid level sensor 104 is disposed at the bottom of the heating rod, which effectively realizes that the liquid level is always in contact with the heating rod to avoid the dry burning of the heating rod.

When the animal repelling device is used, there are various mounting orientation, such as horizontal orientation. At this point, although most of the liquid is vaporized, the bottom of the heating rod still contacts the liquid such that the remaining amount of the liquid cannot be accurately detected.

In some embodiments, a second liquid level sensor is further disposed on a circumferential surface of the heating rod.

In the present embodiment, in order to ensure that information about the liquid volume is accurately detected, the liquid level sensor is further disposed on the circumferential surface of the heating rod. A plurality of second liquid level sensors may be disposed on the circumferential surface of the heating rod according to the circumference diameter of the heating rod and other factors. For instance, three liquid level sensors are uniformly distributed along the circumferential direction of the heating rod.

The vaporization efficiency of the liquid can be improved by using the heating rod, but enough electrical energy must be guaranteed to be provided to the heating rod for heating. When the power supply 106 cannot provide power due to certain reason, the power supply 106 must be cut off in time, so that the user can take corresponding measures.

The volatile liquid injected into the container 101 can volatilize to the outside of the container 101 to repel animals around. The heating rod is adopted to heat the volatile liquid to accelerate the vaporization and enhance the effect of repelling animals. However, in this way, once upon the volatile liquid is injected into the container, the animal repelling device always volatilizes the liquid to the outside of the container 101, even in the case that animals cannot approach, such as during the traveling of a vehicle. Hence, the waste of the liquid is caused.

In some embodiments, the animal repelling device further includes a valve 108 disposed between the through holes 103 and the opening of the container 101.

By arrangement of the valve 108, the liquid is saved and the waste is reduced since the valve 108 can be closed when not repelling animals. For both the opening and closing of the valve 108 and the heating operation of the heating rod, it is necessary to ensure sufficient power capacity in the power supply 106.

In some embodiments, the animal repelling device further includes a power sensor 107 configured to send a power supply capacity signal to the wireless communication component 109.

Since the power supply capacity can be detected by the power sensor 107, when the power supply capacity is less than the predetermined threshold, the power supply 106 is controlled to be cut off. In the present disclosure, as described above, a solar battery is adopted as the power supply 106. When the power supply 106 cannot provide power for the heating rod due to failure or other reasons, the power sensor 107 transmits a signal of insufficient power supply capacity to the wireless communication component 109, and the wireless communication component 109 controls the power supply 106 to be cut off.

The animal repelling device with the above structure enables users to easily implement automatic control at the scene, but cannot achieve remote control.

In some embodiments, the animal repelling device further includes a control terminal 300 configured to control the opening and closing of the valve 108 and the heating of the heater based on the wireless communication component 109.

The control terminal 300 transmits information with the wireless communication component 109 remotely through wireless communication, and receives status information, including level information, power supply capacity information, etc., of the animal repelling device through the wireless communication component 109. Moreover, the control terminal 300 sends a control instruction, such as a power supply on/off instruction and a valve opening/closing instruction, to the wireless communication component 109. The control terminal 300 may be a mobile terminal such as a notebook computer, a tablet or a mobile phone. Taking the mobile phone as an example, a control program is installed on the mobile phone, and the animal repelling device is monitored in the control program. When an alarm signal is received by the mobile phone, the user can be notified through common alarm approaches such as text notification, audible alarm, and indicator light flashing, which greatly facilitates the user's remote control of the animal repelling device.

The animal repelling device does not need too much volume as long as the liquid vaporization speed is sufficient to repel the animals, since the opening size of the valve 108 can be controlled to save the volatile liquid. Therefore, the container 101 can adopt a small container, but it might be not stable enough.

Figure 4A:
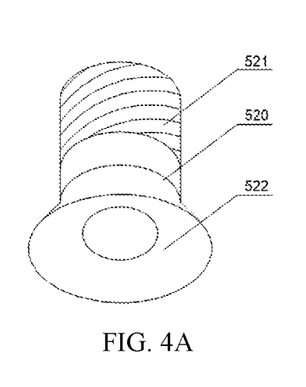
FIG. 4A is a perspective view illustrating a suction connector of the animal repelling device in accordance with some embodiments of the present disclosure.
Figure 4B:
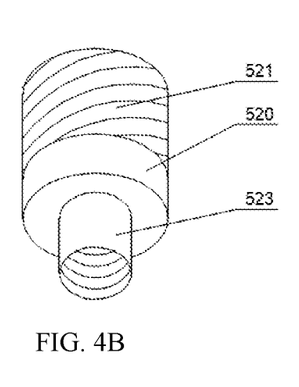
FIG. 4B is a perspective view illustrating a reducing joint adapter connector of the animal repelling device in accordance with some embodiments of the present disclosure.
Figure 4C:
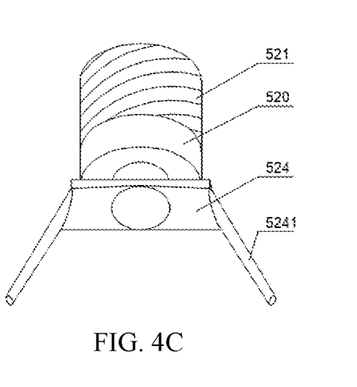
FIG. 4C is a perspective view illustrating a bracket connector of the animal repelling device in accordance with some embodiments of the present disclosure.
Figure 5:
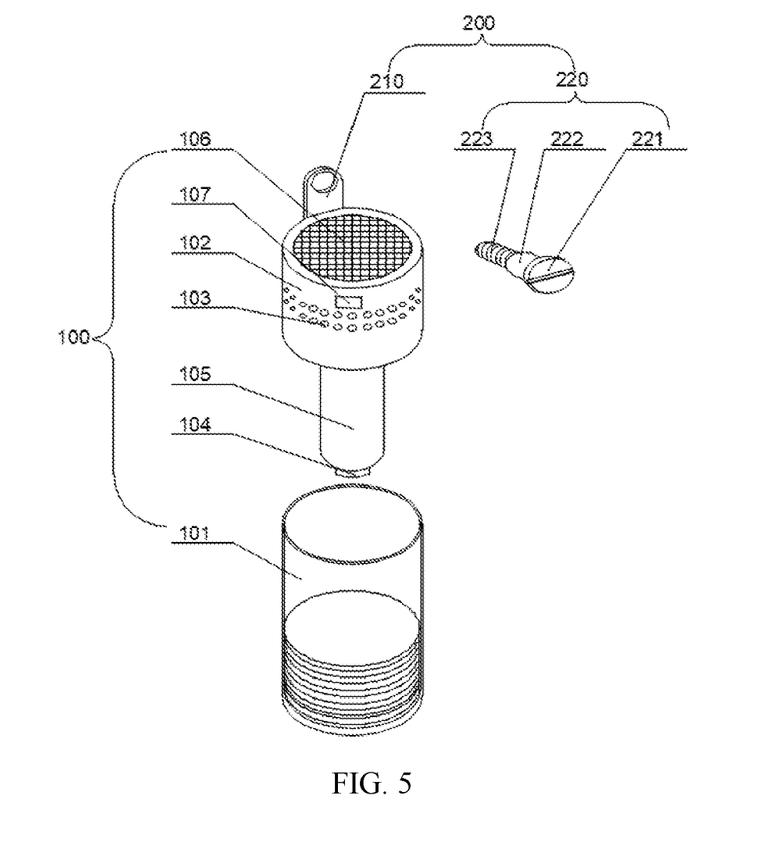
FIG. 5 is an exploded view illustrating the animal repelling device in accordance with some embodiments of the present disclosure.

FIGS. 4A, 4B, and 4C are perspective views illustrating connectors of the animal repelling device in accordance with some embodiments of the present disclosure. FIG. 4A is a perspective view of a suction connector of the animal repelling device in accordance with some embodiments of the present disclosure. FIG. 4B is a perspective view illustrating a reducing joint adapter connector of the animal repelling device in accordance with some embodiments of the present disclosure. FIG. 4C is a perspective view illustrating a bracket connector of the animal repelling device in accordance with some embodiments of the present disclosure. FIG. 5 is an exploded view of the animal repelling device in accordance with some embodiments of the present disclosure.

In some embodiments, referring to FIGS. 4A, 4B, 4C, and 5, the animal repelling device further includes a fixing structure 500 configured to fix the animal repelling device.

The stability of the animal repelling device can be increased by the fixing structure 500. The fixing structure 500 has multiple fixing modes. Different fixing modes may be selected according to actual conditions.

In some embodiments, the fixing structure 500 includes an internal threaded hole portion 510 extending from the bottom of the container 101 in a direction distal from the end cap 102.

At a place provided with a screw, the animal repelling device is fixed by the engagement between threaded hole and the screw, since the internal threaded hole portion 510 is arranged at the bottom of the container. For instance, the animal repelling device is fixed at an air inlet of a wheel through the engagement between the threaded hole of the threaded hole portion 510 and external threads of the air inlet. Other accessories may be adopted for connection in other places or when the size of the screw does not match the threaded hole.

In some embodiments, referring to FIGS. 4A, 4B and 4C, the fixing structure 500 further includes a connector 520 which is a suction connector, a reducing joint adapter connector or a bracket connector. The suction connector, the reducing joint adapter connector or the bracket connector is connected with the container 101 through the internal threaded hole portion 510.

The suction connector includes a stud 521 and a suction cup 522 connected with each other. The stud 521 is engaged with the threaded hole portion 510. The suction cup 522 is configured to adsorb the animal repelling device on a smooth plane such as marble floor, wall, etc.

The reducing joint adapter connector includes a stud 521 and a reducing portion 523. The reducing portion 523 may be an internal threaded hole or an external thread stud. The stud 521 is engaged with the threaded hole portion 510. Threads of the reducing portion 523 are engaged with threads at a fixing position.

The bracket connector includes a stud 521 and a bracket 524 connected with each other. The stud 521 is engaged with the threaded hole portion 510. The bracket 524 is configured to support the animal repelling device on the ground or insert the animal repelling device into the soil. The bracket includes at least two legs 5241. No matter the animal repelling device is supported on the ground or inserted in the soil, three legs 5241 can stably support the animal repelling container. In addition, a clamp connector may also be adopted. One clamping band may be connected below the stud 521 to fix on a tube. No further description will be given herein. By the above fixing modes, the animal repelling device can be fixed in different orientations and is applicable to various cases. In order to avoid the liquid from flowing out of the container 101, the end cap 102 must be kept upwards as much as possible while fixing the animal repelling device. For instance, if fixed on a wheel, the animal repelling device may be fixed on an air inlet of the wheel through the threaded hole portion 510 of the fixing structure 500 and the reducing joint adapter connector.

In order to prevent the liquid from flowing out of the container 101, the container 101 may be rotatably fixed on a hub or an axle of the wheel (herein, "rotatably" means the container 101 would rotate relative to hub or an axle of the wheel but not rotate together with the wheel and the hub thereof).

FIG. 5 is an exploded view illustrating the animal repelling device in accordance with some embodiments of the present disclosure.

In some embodiments, the attaching structure 200 includes a bolt 220 and a connecting member 210. The bolt 220 includes a nut 221, a polished rod 222 and a screw rod 223 sequentially connected. The screw rod 223 is engaged with a threaded hole on an end surface of the hub or the axle of the car wheel. One end of the connecting member 210 is fixed on the end cap 102, and the other end of the connecting member 210 is provided with a circular ring. The outside diameter of the screw rod 223 is less than the outside diameter of the polished rod 222, and the outside diameter of the polished rod 222 is less than the inside diameter of the circular ring.

The attaching structure 200 with the above structure is simplified and convenient to install. As the outside diameter of the screw rod 223 is less than the outside diameter of the polished rod 222, the screw rod 223 can be completely screwed into a threaded hole to realize good connection between the screw rod 223 and the hub or the axle of the wheel. As the inside diameter of the circular ring is greater than the outside diameter of the polished rod 222, the animal repelling device is mounted around an axle center of the bolt 220 in a free rotation mode (herein, "in a free rotation mode" means that the container of the device would rotate relative to the bolt 220 but not rotate together with the bolt 220 and hub or the axle of the wheel), such that the end cap 102 is always oriented on the upper portion of the animal repelling device to prevent the liquid from flowing out. In the embodiment, the screw rod 223 may be fixed on the center of the wheel axle, so as to effectively avoid the liquid be thrown out of the device due to centrifugal force during moving of the car.

Animals such as cats and dogs often urinate and defecate on the tires of car parking. In the driving process, animals cannot urinate and defecate. Thus, the animal repelling device provided by the present disclosure begins to volatilize the liquid when the car is parked, so the animal repelling device may be placed near the wheel. But if the animal repelling device is not fixed, the driver has to put the animal repelling device after parking and get it back before moving the car. It is troublesome and brings inconvenience to the driver. Therefore, the animal repelling device can be connected with the wheel. No matter the car is parked or moving, no manual setting operation is required for the animal repelling device. However, wheels are rotating during driving, and every point on the wheel when parked is in different orientation each time. Therefore, in order to ensure that the liquid does not flow out of the device, the animal repelling device must be arranged to orient the end cap 102 on the upper portion of the device.

The animal repelling device can be fixed on the hub or the axle of the wheel via the attaching structure 200, so as to reduce the operation of the driver in arranging the animal repelling device and improve the user experience. The animal repelling device is mounted on the hub or the axle of the wheel in a free rotation mode, so as to avoid the liquid from flowing out via the through holes and the like. There are multiple specific rotatable connection modes between the animal repelling device and the hub or the axle. No complicated fixing/attaching structure is required, thereby reducing the cost, simplifying manufacturing process with convenient installation.

The animal repelling device is mounted on the wheel. When the car is parked, the valve 108 is opened, so that the liquid can volatilize to repel animals. In the driving process of the car, the valve 108 is closed to save the liquid since animals cannot urinate and defecate.

In some embodiments, the wireless communication component 109 receives an instruction sent by a vehicle controller 400.

After the car is started, the vehicle controller 400 sends a closing instruction to the valve 108 through the wireless communication component 109, and sends a power off instruction to the power supply 106, so that the valve 108 is automatically closed and the power supply 106 is automatically cut off. Thus, it is advantageous to save the liquid, reduce the manual operations with improved user experience.

Figure 6:
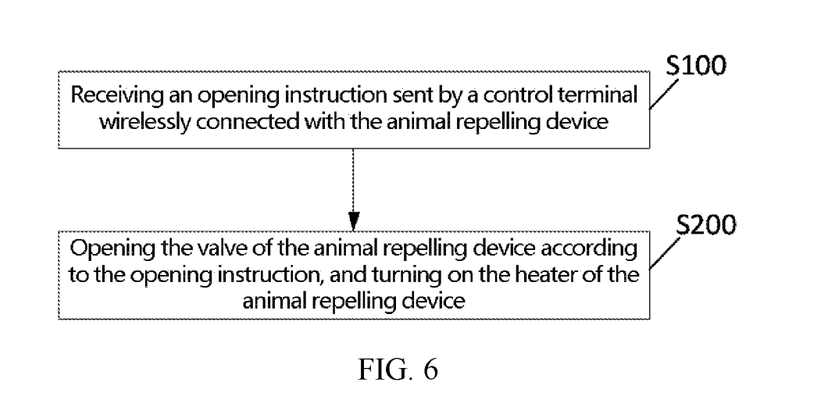
FIG. 6 is a flowchart illustrating an animal repelling method in accordance with some embodiments of the present disclosure.

FIG. 6 is a flowchart illustrating an animal repelling method in accordance with some embodiments of the present disclosure.

Referring to FIG. 6, according to another aspect of the present disclosure, there is provided an animal repelling method being applied to an animal repelling device including a valve and a heater immersed into a volatile liquid for repelling animals. The method comprises:

S100: receiving an opening instruction sent by a control terminal wirelessly connected with the animal repelling device.

S200: opening the valve of the animal repelling device according to the opening instruction, and turning on the heater of the animal repelling device.

The volatile liquid for repelling animals can be injected into the container to repel the animals through the vaporization of the liquid. In order to improve the vaporization of the liquid and enhance the stimulation on the animals, the vaporization speed of the liquid is increased by the heating operation of the heating rod. When the liquid is reduced such that the liquid level reaches the bottom of the heating rod, in order to avoid the damage of the heating rod due to the dry burning of the heating rod, liquid level information is transmitted to the control terminal through the liquid level sensor, then the control terminal sends a power off signal to the power supply through the wireless communication component after receiving the signal that the liquid level is at the bottom of the heating rod such that the power supply is cut off. After the user injects the volatile liquid for repelling animals into the animal repelling device and the power supply is powered on again, the animal repelling device works normally again.

In the embodiment, the control terminal may be a mobile terminal such as a mobile phone or a remote controller.

The animal repelling method for the car provided by the present disclosure effectively has the function of repelling animals by injecting the volatile liquid with pungent odor on animals into the container, and can automatically monitor the insufficiency of the volatile liquid by the liquid level sensor transmitting the liquid level information to the control terminal, so as to replenish the volatile liquid in time.

In some embodiments, the animal repelling device also includes a liquid level sensor. The method further includes allowing the wireless communication component to control the cut-off of the power supply when the liquid level sensor detects that the liquid level is lower than the predetermined level. When the liquid level is lower than the predetermined level, it indicates that the liquid in the container tends to be completely vaporized, the animal repelling device need to turn off the heater while reminding the user replenishes the volatile liquid for repelling animals in the container in time.

In some embodiments, the method further includes sending information that the liquid level is lower than the predetermined level to the control terminal, to remind the user to replenish the liquid in time. The wireless communication component and the control terminal are in wireless communication. The wireless communication component sends information about the liquid remaining volume in the container to the control terminal at any time. When insufficient liquid volume is detected, the control terminal sends out notification information to notify the user to replenish the liquid in time, thereby realizing the remote monitoring of the animal repelling device.

In some embodiments, the method further includes sending capacity reminding information that the power supply capacity is lower than the predetermined threshold to the control terminal when a power sensor of the animal repelling device detects that the power supply capacity is lower than a predetermined threshold, to remind the user to replace batteries or charge in time. The wireless communication component and the control terminal are in wireless communication. The wireless communication component sends the capacity reminding information of the power supply to the control terminal at any time. When insufficient power supply capacity is detected, the control terminal sends notification information to notify the user to replace the power supply, namely the end cap, in time, or take measures such as maintenance on the power supply, thereby realizing the remote monitoring of the animal repelling device. The battery may be a solar battery, a dry battery, or a rechargeable battery, etc.

In some embodiments, the control terminal sends a power supply on/off instruction and a valve opening/closing instruction to the wireless communication component, realizing the initiative remote control of the user on the valve and the power supply. For instance, when the car enters the garage and there is no animal in the garage, if the animal repelling device still works to volatilize the liquid, the liquid will be wasted. Accordingly, the control terminal may be initiatively operated by users to close the valve and cut off the power supply.

In some embodiments, the vehicle controller of the car sends the operating status of an engine to the wireless communication component. When the operating status is off, the heater is turned on and the valve is opened. When the operating status is on, the heater is turned off and the valve is closed.

Animals might urinate and defecate on the wheels only when the car is parked. Therefore, in order to save the liquid, after starting the car or during the moving of the car, the vehicle controller sends the power off instruction and the valve closing instruction to the animal repelling device through the wireless communication component, such that the power supply is cut off and the valve is closed.

As such, the animal repelling method of the car provided by various embodiments of the present disclosure can effectively repel animals through the vaporization of the volatile liquid for repelling the animals when the car is parked, and effectively protect the heating rod from being burned out and remind users to replenish the liquid by cooperation the between liquid level sensor and the control terminal.

Hereinafter, the animal repelling method provided by various embodiments of the present disclosure is illustrated in an example of a car to repel animals and prevent the animals from urinating and defecating on the wheels of the car.

The user can inject the volatile liquid for repelling animals into the container, closes the end cap, and now the heating rod is inserted into the liquid, and the lower end portion is proximal to the bottom of the container. Then, put the bolt through the circular ring of the attaching structure of the animal repelling device for the car, the screw is partially screwed into the threaded hole on the axle center of the wheel Such that the animal repelling device is hung on the axle of the wheel. Next, open the valve, and power on the power supply. The volatile liquid is vaporized to the outside via the through holes on the side wall of the end cap by the heating rod. The animals are kept away from the wheels while smelling the irritant odor of the volatile gas, thereby effectively preventing the animals from urinating and defecating on the wheels.

The user can leave after mounting and starting the animal repelling device for the car. Along with the vaporization of the liquid, the liquid level sensor sends the liquid level information to the mobile phone through the wireless communication component at any time. A device monitoring application (APP) is installed on the mobile phone in advance. The user can check the liquid level information of the device at any time through the APP on the mobile phone. When the liquid level sensor detects that the liquid level has reached the bottom of the heating rod, the mobile phone gives an alarm and sends out notification information. Then, the user cuts off the power supply of the animal repelling device for the car through the APP, and the heating rod stops heating. The user can replenish the volatile liquid in the container, close the end cap and then switch on the power supply.

In the use process, the power sensor monitors the power supply capacity in real time and sends power supply capacity information to the mobile phone through the wireless communication component. When detecting that the power supply capacity tends to be exhausted, the mobile phone gives an alarm and sends out notification information. The user can cut off the power supply through the APP, check the power supply, and repairs or replaces the end cap.

In the use process, the user can cut off the power supply and close the valve through the APP according to conditions, for example, after the car enters the garage.

In the use process, when the user wants to drive away and start the car, the vehicle controller automatically sends a closing instruction to the valve and sends a power off instruction to the power supply, through the wireless communication component Such that the valve is closed and the power supply is cut off. When the car arrives at the destination and is parked, the user gets off the car and opens the valve and switches on the power supply through the APP on the mobile phone.

Other embodiments of the invention will be apparent to those skilled in the art from consideration of the specification and practice of the invention disclosed here. This application is intended to cover any variations, uses, or adaptations of the invention following the general principles thereof and including contents undisclosed from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An animal repelling device, comprising:
   a container having an opening at one end thereof and a liquid storage space therein;
   an end cap having a top plate and a side wall surrounding the opening, the side wall or the top plate forming with through holes;
   one or more liquid level sensors disposed in the container and proximal to bottom of the container; and
   a wireless communication component disposed on the container and configured to receive a liquid level signal sent by the liquid level sensor,
   wherein the device is configured to automatically detect a remaining amount of volatile liquid by arrangement of the liquid level sensors so as to replenish the volatile liquid accordingly, and automatically control vaporization of the volatile liquid for repelling animals.

2. The animal repelling device according to claim 1, further comprising:
   a heater disposed in the container; and a power supply electrically connected with the heater;
wherein the heater operates based on a heater-operating instruction received by the wireless communication component.

3. The animal repelling device according to claim 2, wherein
the power supply is a solar-energy photo-voltaic power supply disposed at an outer surface of the side wall or the top plate of the end cap.

4. The animal repelling device according to claim 2, wherein
the heater is a heating rod with one end connected to the end cap and the other end extending towards the bottom in the container.

5. The animal repelling device according to claim 4, wherein
the one or more liquid level sensors comprises a first liquid level sensor disposed at one end of the heating rod proximal to the bottom of the container.

6. The animal repelling device according to claim 5, wherein
the one or more liquid level sensors further comprises a plurality of second liquid level sensors disposed on a circumferential surface of the heating rod.

7. The animal repelling device according to claim 4, wherein
the one or more liquid level sensors comprises a plurality of second liquid level sensors disposed on a circumferential surface of the heating rod.

8. The animal repelling device according to claim 2, wherein
the animal repelling device further comprises a valve disposed between the through holes and the opening of the container.

9. The animal repelling device according to claim 8, further comprising a control terminal controlling opening and closing of the valve and operation of the heater based on information received by the wireless communication component.

10. The animal repelling device according to claim 2, further comprising a power sensor sending a power supply capacity signal to the wireless communication component.

11. The animal repelling device according to claim 1, further comprising a fixing structure comprising an internal threaded hole portion extending from the bottom of the container in a direction distal from the end cap.

12. The animal repelling device according to claim 11, wherein
the fixing structure further comprises one or more connectors connected with the container through the internal threaded hole portion; and
the one or more connectors comprise at least one of a suction connector, a reducing joint adapter connector and a bracket connector.

13. The animal repelling device according to claim 1, further comprising an attaching structure comprising:
a bolt having a nut, a polished rod and a screw rod connected sequentially; and
a connecting member with one end fixed on the end cap and the other end provided with a circular ring;
wherein an outside diameter of the screw rod is less than an outside diameter of the polished rod, and the outside diameter of the polished rod is less than an inside diameter of the circular ring.

14. The animal repelling device according to claim 1, further comprising:
a fixing structure comprising an internal threaded hole portion extending from the bottom of the container in a direction distal from the end cap, and a connector connected with the container through the internal threaded hole portion;
an attaching structure comprising a bolt having a nut, a polished rod and a screw rod connected sequentially; and a connecting member with one end fixed on the end cap and the other end provided with a circular ring;
wherein an outside diameter of the screw rod is less than an outside diameter of the polished rod, and the outside diameter of the polished rod is less than an inside diameter of the circular ring.

15. The animal repelling device according to claim 1, further comprising a structure configured to mounting the animal repelling device to an axle of car wheel in an orientation that the end cap surrounding the opening is kept upwards.

16. The animal repelling device according to claim 1, further comprising:
a structure configured to mount the device to an axle of a wheel of an automobile in an orientation that the end cap surrounding the opening is kept upwards;
wherein the device is mounted at the axle in a free rotation mode, so as to avoid the liquid being thrown out of the device due to centrifugal force from spinning of the wheel.

17. An animal repelling method, applied to an animal repelling device comprising a valve, a heater immersed in a volatile liquid for repelling animal, and a liquid level sensor, the method comprising:
receiving an opening instruction sent by a control terminal wirelessly connected with the animal repelling device;
opening the valve of the animal repelling device according to the opening instruction, and turning on the heater of the animal repelling device;
automatically detecting a remaining amount of volatile liquid by arrangement of the liquid level sensor so as to replenish the volatile liquid accordingly; and
automatically controlling vaporization of the volatile liquid for repelling animals.

18. The animal repelling method according to claim 17, further comprising:
turning off the heater of the animal repelling device when the liquid level sensor detects that the liquid level is lower than a predetermined level.

19. The animal repelling method according to claim 18, further comprising:
sending liquid replenishment information that the liquid level is lower than the predetermined level to the control terminal, to remind a user to replenish the liquid in time; and
sending capacity reminding information that a power supply capacity is lower than a predetermined threshold to the control terminal when a power sensor of the animal repelling device detects that the power supply capacity is lower than the predetermined threshold, to remind the user to replace batteries or charge in time.

20. The animal repelling method according to claim 17, further comprising:
receiving information associated with an operating status of an equipment provided with the animal repelling device;
turning on the heater and opening the valve when the operating status is off; and turning off the heater and closing the valve when the operating status is on.

\* \* \* \* \*